(12) United States Patent
Kwag et al.

(10) Patent No.: US 9,992,435 B2
(45) Date of Patent: Jun. 5, 2018

(54) IMAGE SENSING DEVICE AND METHOD FOR DRIVING THE SAME

(71) Applicant: SK hynix Inc., Gyeonggi-do (KR)

(72) Inventors: Pyong-Su Kwag, Gyeonggi-do (KR); Sung-Kun Park, Gyeonggi-do (KR); Yun-Hui Yang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days. days.

(21) Appl. No.: 15/152,339

(22) Filed: May 11, 2016

(65) Prior Publication Data

US 2017/0208282 A1   Jul. 20, 2017

(30) Foreign Application Priority Data

Jan. 19, 2016   (KR) .......................... 10-2016-0006410

(51) Int. Cl.

| H04N 5/376 | (2011.01) |
| H04N 5/235 | (2006.01) |
| H04N 5/335 | (2011.01) |
| H04N 5/378 | (2011.01) |
| H04N 5/247 | (2006.01) |
| H01L 27/146 | (2006.01) |

(52) U.S. Cl.
CPC .................................. *H04N 5/3765* (2013.01)

(58) Field of Classification Search
CPC ...... H04N 5/3765; H04N 5/235; H04N 5/247; H04N 5/335; H04N 5/378; H04N 5/3559; H01L 27/146; H01L 27/14623; H01L 27/14609; H01L 27/14643

USPC .............. 348/294, 308, 302; 250/208.1, 214, 250/214 R; 257/291, 292, 443, 239, 261, 257/314, 315, 317

See application file for complete search history.

(56) References Cited

U.S. PATENT DOCUMENTS

| 8,294,077 | B2* | 10/2012 | Mao | H04N 5/35509 |
| | | | | 250/208.1 |
| 9,491,386 | B2* | 11/2016 | Chen | H04N 5/3741 |
| 9,762,819 | B2* | 9/2017 | Jo | H04N 5/335 |
| 2007/0147132 | A1* | 6/2007 | Lee | H04N 3/1512 |
| | | | | 365/185.23 |
| 2009/0272879 | A1* | 11/2009 | Dai | H04N 5/3559 |
| | | | | 250/208.1 |
| 2011/0036969 | A1* | 2/2011 | Ahn | H01L 27/14609 |
| | | | | 250/208.1 |

(Continued)

FOREIGN PATENT DOCUMENTS

KR   1020060001804   1/2006

*Primary Examiner* — Tuan Ho
*Assistant Examiner* — Marly Camargo
(74) *Attorney, Agent, or Firm* — IP & T Group LLP

(57) ABSTRACT

An image sensing device includes: a floating diffusion node; an initialization block suitable for initializing the floating diffusion node with a first voltage, based on an initialization control signal; a boosting block suitable for boosting the floating diffusion node with a second voltage, based on a boost control signal; a photodiode suitable for generating a photocharge based on incident light; a transmission block suitable for transmitting the photocharge to the floating diffusion node based on a transmission control signal; and a selection block suitable for generating a pixel signal corresponding to a voltage loaded on the floating diffusion node based on a selection control signal.

9 Claims, 4 Drawing Sheets

(56) References Cited

U.S. PATENT DOCUMENTS

| | | | | |
|---|---|---|---|---|
| 2013/0082313 A1* | 4/2013 | Manabe | ............ | H01L 27/14603 257/292 |
| 2014/0042302 A1* | 2/2014 | Yanagita | ........... | H01L 27/14603 250/208.1 |
| 2015/0372038 A1* | 12/2015 | Lee | ................... | H01L 27/14643 348/294 |

* cited by examiner

IMAGE SENSING DEVICE AND METHOD FOR DRIVING THE SAME

CROSS-REFERENCE TO RELATED APPLICATIONS

The present application claims priority of Korean Patent Application No. 10-2016-0006410, filed on Jan. 19, 2016, which is incorporated herein by reference in its entirety.

BACKGROUND

1. Field

Exemplary embodiments of the present invention relate generally to a semiconductor design technology and, more particularly, to an image sensing device and a method for driving the same.

2. Description of the Related Art

Image sensing devices capture images using photosensitive properties of semiconductors. Image sensing devices are often classified into charge-coupled device (CCD) image sensors and complementary metal-oxide semiconductor (CMOS) image sensors. CMOS image sensors allow for both analog and digital control circuits to be directly realized on a single integrated circuit (IC), making CMOS image sensors the most widely used type of image sensor.

SUMMARY

Exemplary embodiments of the present invention are directed to an image sensing device having an improved transmission capability to transmit a photocharge generated from a photodiode to a floating diffusion node, and a method for driving the image sensing device.

In accordance, with an embodiment of the present invention, an image sensing device includes: a floating diffusion node; an initialization block suitable for initializing the floating diffusion node with a first voltage, based on an initialization control signal; a boosting block suitable for boosting the floating diffusion node with a second voltage, based on a boost control signal; a photodiode suitable for generating a photocharge based on incident light; a transmission block suitable for transmitting the photocharge to the floating diffusion node based on a transmission control signal; and a selection block suitable for generating a pixel signal corresponding to a voltage loaded on the floating diffusion node based on a selection control signal.

The image sensing device may further include: a control block suitable for generating the initialization control signal during an initialization period and generating the selection control signal during a selection period after the initialization period and sequentially generating the boost control signal and the transmission control signal during the selection period.

The control block may generate the transmission control signal during the initialization period.

The selection block may include; a driving unit suitable for driving the pixel signal with the first voltage based on the voltage loaded on the floating diffusion node; and an output unit suitable for outputting the pixel signal based on the selection control signal.

The selection block may generate a reference signal corresponding to the second voltage as the pixel signal and generate a data signal corresponding to the photocharge as the pixel signal.

The image sensing device may further include: a sampling block suitable for sequentially sampling the reference signal and the data signal.

The second voltage may be higher than the first voltage.

In accordance with another embodiment of the present invention, an image sensing device includes: a floating diffusion node; a boosting block suitable for initializing and boosting the floating diffusion node with a first voltage based on a boost control signal; a photodiode suitable for generating a photocharge based on incident light; a transmission block suitable for transmitting the photocharge to the floating diffusion node based on a transmission control signal; and a selection block suitable for generating a pixel signal corresponding to a voltage loaded on the floating diffusion node based on a selection control signal, with a second voltage.

The image sensing device may further include: a control block suitable for generating the boost control signal during an initialization period and generating the selection control signal during a selection period after the initialization period and sequentially generating the boost control signal and the transmission control signal during the selection period.

The control block may generate the transmission control signal during the initialization period.

The selection block may include; a driving unit suitable for driving the pixel signal with the second voltage based on the voltage loaded on the floating diffusion node; and an output unit suitable for outputting the pixel signal based on the selection control signal.

The selection block may generate a reference signal corresponding to the first voltage as the pixel signal and generate a data signal corresponding to the photocharge as the pixel signal.

The image sensing device may further include: a sampling block suitable for sequentially sampling the reference signal and the data signal.

The first voltage may be higher than the second voltage.

In accordance with another embodiment of the present invention, a method for driving an image sensing device includes: boosting a floating diffusion node with a first voltage different from a second voltage during a reference period; generating a reference signal corresponding to the first voltage with the second voltage based on a voltage loaded on the floating diffusion node; transmitting a photocharge from a photodiode to the floating diffusion node during a transmission period after the reference period; and generating a data signal corresponding to the photocharge with the second voltage, based on the voltage loaded on the floating diffusion node.

The floating diffusion node may be initialized with the second voltage during an initialization period before the reference period.

The floating diffusion node may be initialized with the first voltage during the initialization period before the reference period.

The method may further include: outputting the reference signal first and outputting the data signal later.

The method may further include: sampling the reference signal; and sampling the data signal.

The first voltage may be higher than the second voltage.

DETAILED DESCRIPTION

Exemplary embodiments of the present invention will be described below in more detail with reference to the accompanying drawings. These embodiments are provided so that this disclosure is thorough and complete. The embodiments presented are merely examples and are not intended to limit the scope of the invention.

The terminology used herein is for the purpose of describing particular embodiments only and is not intended to be limiting of the invention. As used herein, singular forms are intended to include the plural forms as well, unless the context clearly indicates otherwise.

It will be further understood that the terms "comprises," "comprising," "Includes," and/or "Including" when used in this specification, indicate the presence of stated elements, but do not preclude the presence or addition of one or more other elements. As used herein, the term "and/or" indicates any and all combinations of one or more of the associated listed items.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate elements of the embodiments.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element described in connection with one embodiment may be used singly or in combination with other elements of another embodiment, unless otherwise specifically indicated.

Hereinafter, the various embodiments of the present invention will be described in detail with reference to the attached drawings.

Figure 1:
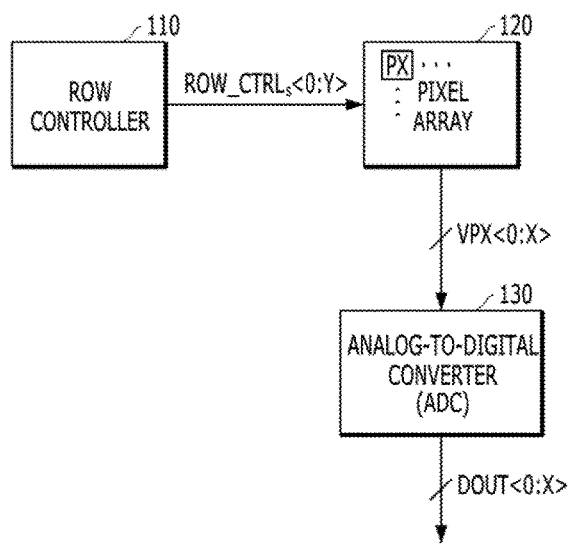
FIG. 1 is a block diagram illustrating an image sensing device, according to an embodiment of the present invention.

Referring now to FIG. 1, an image sensing device 100, according to an embodiment of the present invention, may include a row controller 110, a pixel array 120, and an analog-to-digital converter (ADC) 130.

The row controller 110 may generate first to $(Y+1)^{th}$ row control signals ROW_CTRLs<0:Y> for controlling an operation of the pixel array 120 on a per row unit basis, wherein Y is a natural number. For example, the row controller 110 may include first to $(Y+1)^{th}$ control blocks (not illustrated) for generating the first to $(Y+1)^{th}$ row control signals ROW_CTRLs<0:Y>. Each of the first to $(Y+1)^{th}$ row control signals ROW_CTRLs<0:Y> may control the operation of a single row of the pixel array, i.e., may control the operation of a plurality of pixels that are coupled to a single row. Each of the first to $(Y+1)^{th}$ row control signals ROW_CTRLs<0:Y> may include an initialization control signal R<k>, a boost control signal B<k>, a transmission control signal T<k>, and a selection control signal S<k> (Shown in FIG. 4). For example, the first row control signal ROW_CTRL<0> may include a first initialization control signal R<0>, a first boost control signal B<0>, a first transmission control signal T<0> and a first selection control signal S<0> (Shown in FIG. 2). The $(Y+1)^{th}$ row control signal ROW_CTRL<Y> may include a $(Y+1)^{th}$ initialization control signal R<Y>, a $(Y+1)^{th}$ boost control signal B<Y>, a $(Y+1)^{th}$ transmission control signal T<Y> and a $(Y+1)^{th}$ selection control signal S<Y>.

The pixel array 120 may include a plurality of pixels PX arranged in rows and columns. The pixels PX may generate first to $(X+1)^{th}$ pixel signals VPX<0:X> on a per row unit basis for each of the first to $(Y+1)^{th}$ row control signals ROW_CTRLs<0:Y>, wherein X is a natural number. X+1 is the number of pixels in a row. For example, X+1 pixels arranged in a first row may simultaneously generate the first to $(X+1)^{th}$ pixel signals VPX<0:X> during a first row time based on the first row control signal ROW_CTRL<0>. Likewise, X+1 pixels arranged in the last row may simultaneously generate the first to $(X+1)^{th}$ pixel signals VPX<0:X> during a $(Y+1)^{th}$ row time based on the $(Y+1)^{th}$ row control signal ROW_CTRL<Y>.

The analog-to-digital converter (ADC) 130 may convert the first to $(X+1)^{th}$ pixel signals VPX<0:X> into first to $(X+1)^{th}$ digital signals DOUT<0:X>, respectively. Although not Illustrated in the drawing, the analog-to-digital converter (ADC) 130 may include first to $(X+1)^{th}$ readout circuit blocks for converting the first to $(X+1)^{th}$ pixel signals VPX<0:X> into the first to $(X+1)^{th}$ digital signals DOUT<0:X>.

Figure 2:
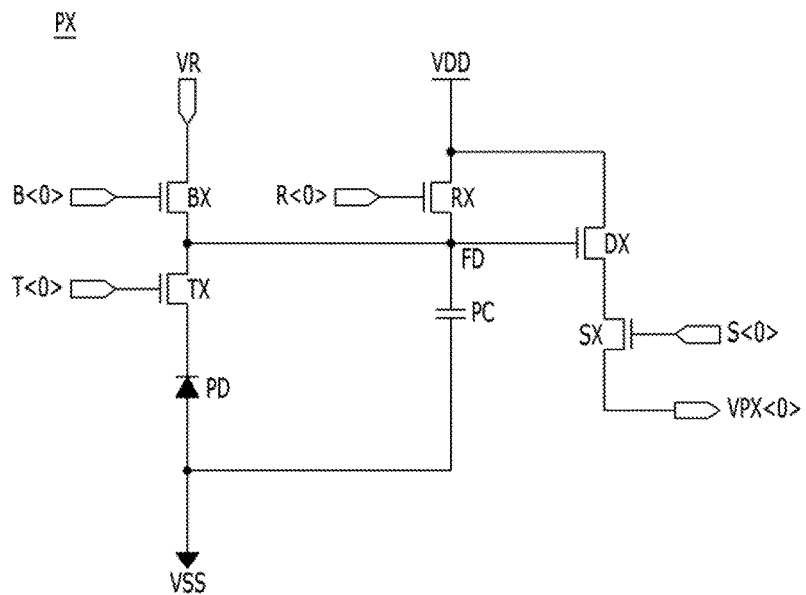
FIG. 2 is a circuit diagram illustrating a pixel configuration, according to an embodiment of the present invention.

FIG. 2 is a circuit diagram illustrating a pixel configuration according to an embodiment of the present invention. Since the pixels in a pixel array may have the same structure, a pixel PX arranged at a cross point of the first row and a first column is representatively described hereinafter.

Referring to FIG. 2, the pixel PX may include a photodiode PD, a floating diffusion node FD, an initialization block RX, a boosting block BX, a transmission block TX, and selection blocks DX and SX.

The photodiode PD may generate a photocharge based on incident light during an exposure period.

The floating diffusion node FD may accumulate the photocharge. For example, the floating diffusion node FD may be coupled to a parasitic capacitor PC, and the parasitic capacitor PC may accumulate the photocharge.

The initialization block RX may initialize the floating diffusion node FD with a power source voltage VDD based on the first initialization control signal R<0>. The initialization block RX may initialize the floating diffusion node FD by discharging a charge remaining in the floating diffusion node FD into a power source voltage VDD terminal during an initialization period. For example, the initialization block RX may include an NMOS transistor having a gate where the first initialization control signal R<0> is inputted and a drain and a source coupled between the power source voltage VDD terminal and the floating diffusion node FD.

The boosting block BX may boost the floating diffusion node FD with a boosted voltage VR higher than the power source voltage VDD based on the first boost control signal B<0>. The boosting block BX may boost the floating diffusion node FD with the boosted voltage VR during a reference period after the initialization period. For example, the boosting block BX may include an NMOS transistor having a gate where the first boost control signal B<0> is inputted and a drain and a source coupled between a boosted voltage VR terminal and the floating diffusion node FD.

The transmission block TX may transmit the photocharge to the floating diffusion node FD based on the first transmission control signal T<0>. The transmission block TX may transmit the photocharge to the floating diffusion node FD during a transmission period after the reference period. In addition, the transmission block TX may initialize the photodiode PD based on the first transmission control signal T<0>. The transmission block TX may be enabled along with the initialization block RX during the initialization period and may discharge the photocharge remaining in the floating diffusion node FD into the power source voltage VDD terminal. For example, the transmission block TX may include an NMOS transistor having a gate where the first transmission control signal T<0> is inputted and a drain and a source coupled between the floating diffusion node FD and the photodiode PD.

The selection blocks DX and SX may generate the first pixel signal VPX<0> corresponding to a voltage loaded on the floating diffusion node FD based on the first selection control signal S<0>. The selection blocks DX and SX may generate a reference signal corresponding to the boosted voltage VR as the first pixel signal VPX<0> during the reference period and generate a data signal corresponding to the photocharge as the first pixel signal VPX<0> during the transmission period. For example, the selection blocks DX and SX may include a driving unit DX and an output unit SX. The driving unit DX may drive the first pixel signal VPX<0> with the power source voltage VDD based on the voltage loaded on the floating diffusion node FD. For example, the driving unit DX may include an NMOS transistor having a gate coupled to the floating diffusion node FD and a drain and a source coupled between the power source voltage VDD terminal and the output unit SX. The output unit SX may output the first pixel signal VPX<0> to the analog-to-digital converter (ADC) 130 based on the first selection control signal S<0>. For example, the output unit SX may include an NMOS transistor having a gate where the first selection control signal S<0> is inputted and a drain and a source coupled between the driving unit DX and the analog-to-digital converter (ADC) 130.

Figure 3:
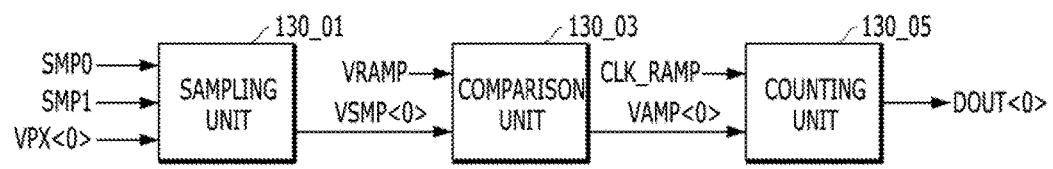
FIG. 3 is a block diagram illustrating an analog-to-digital converter (ADC), according to an embodiment of the present invention.

FIG. 3 is a block diagram illustrating an analog-to-digital converter (ADC) 130, according to an embodiment of the present invention. Particularly, FIG. 3 representatively illustrates a first readout circuit block among the first to $(X+1)^{th}$ readout circuit blocks included in the analog-to-digital converter (ADC) 130. Since the first to $(X+1)^{th}$ readout circuit blocks have the same structure, the first readout circuit block is representatively described hereinafter.

According to the embodiment of FIG. 3, the first readout circuit block may include a sampling unit 130_1, a comparison unit 130_03, and a counting unit 130_05.

The sampling unit 130_1 may sequentially sample the first pixel signal VPX<0> corresponding to the reference signal and the first pixel signal VPX<0> corresponding to the data signal based on first and second sampling control signals SMP0 and SMP1, respectively. For example, the sampling unit 130_1 may sample the first pixel signal VPX<0> corresponding to the reference signal based on the first sampling control signal SMP0, and subsequently sample the first pixel signal VPX<0> corresponding to the data signal based on the second sampling control signal SMP1. For example, the sampling unit 130_1 may include a correlated double sampling (CDS) circuit.

The comparison unit 130_03 may compare the first sampling signal VSMP<0> outputted from the sampling unit 130_1 with a ramp signal VRAMP. To be specific, the comparison unit 130_03 may compare the first sampling signal VSMP<0> corresponding to the reference signal with the ramp signal VRAMP to generate the comparison result as a first comparison signal VAMP<0>. Subsequently, the comparison unit 130_03 may compare the first sampling signal VSMP<0> corresponding to the data signal with the ramp signal VRAMP to generate the comparison result as the first comparison signal VAMP<0>. For example, the comparison unit 130_03 may include a differential amplifier.

The counting unit 130_05 may generate the first digital signal DOUT<0> based on the first comparison signal VAMP<0> and a clock signal CLK_RAMP.

Hereinafter, an operation of the image sensing device 100 having the aforementioned structure is described. As an example, an operation corresponding to the pixel PX arranged at the cross point of the first row and the first column is described below.

Figure 4:
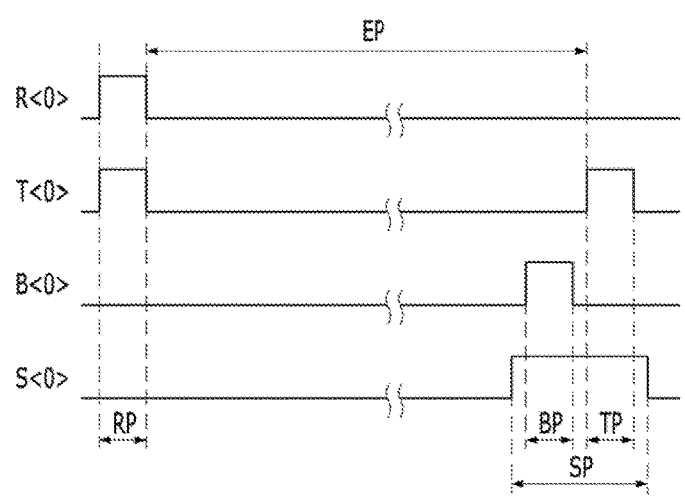
FIG. 4 is a timing diagram describing an operation of an image sensing device, according to an embodiment of the present invention.

FIG. 4 is a timing diagram describing the operation of the pixel PX included in the image sensing device 100 according to an embodiment of the present invention.

Referring to FIG. 4, the row controller 110 may generate the first row control signal ROW_CTRL<0> during the first row time. For example, the first control block of the row controller 110 may enable the first Initialization control signal R<0> and the first transmission control signal T<0> during the initialization period RP and enable the first selection control signal S<0> during a selection period SP after the initialization period RP. In addition, the first control block may sequentially enable the first boost control signal B<0> and the first transmission control signal T<0> during the selection period SP. For example, the first control block may enable the first boost control signal B<0> during the reference period BP corresponding to an initial period of the selection period SP, and subsequently enable the first transmission control signal T<0> during the transmission period TP corresponding to a latter period of the selection period SP.

The pixel PX may generate the first pixel signal VPX<0> based on the first row control signal ROW_CTRL<0>. Detailed descriptions thereon are as follows.

The pixel PX may initialize the photodiode PD and the floating diffusion node FD with the power source voltage VDD during the initialization period RP based on the first initialization control signal R<0> and the first transmission control signal T<0>. For example, the initialization block RX may discharge the charge remaining in the floating diffusion node FD into the power source voltage VDD terminal during the initialization period RP based on the first initialization control signal R<0>, and simultaneously, the transmission block TX may discharge the charge remaining in the photodiode PD into the power source voltage VDD terminal during the initialization period RP based on the first transmission control signal T<0>.

The pixel PX may generate the first pixel signal VPX<0> corresponding to the reference signal during the reference period BP and subsequently generate the first pixel signal VPX<0> corresponding to the data signal during the transmission period TP, based on the first selection control signal S<0>, the first boost control signal B<0> and the first transmission control signal T<0>. For example, the boosting block BX may boost the floating diffusion node FD with the boosted voltage VR higher than the power source voltage VDD during the reference period BP based on the first boost control signal B<0>. The selection blocks DX and SX may generate the reference signal corresponding to the boosted voltage VR as the first pixel signal VPX<0> during the reference period BP based on the voltage loaded on the floating diffusion node FD. The selection blocks DX and SX may generate the first pixel signal VPX<0> based on the power source voltage VDD. The transmission block TX may transmit the photocharge generated from the photodiode PD to the floating diffusion node FD during the transmission period TP based on the first transmission control signal T<0>. The selection blocks DX and SX may generate the data signal corresponding to the photocharge as the first pixel signal VPX<0> during the transmission period TP based on the voltage loaded on the floating diffusion node FD. The selection blocks DX and SX may generate the first pixel signal VPX<0> based on the power source voltage VDD.

The photodiode PD may generate the photocharge during the exposure period EP between a moment when the initialization period RP terminates and a moment when the transmission period TP starts.

Figure 5:
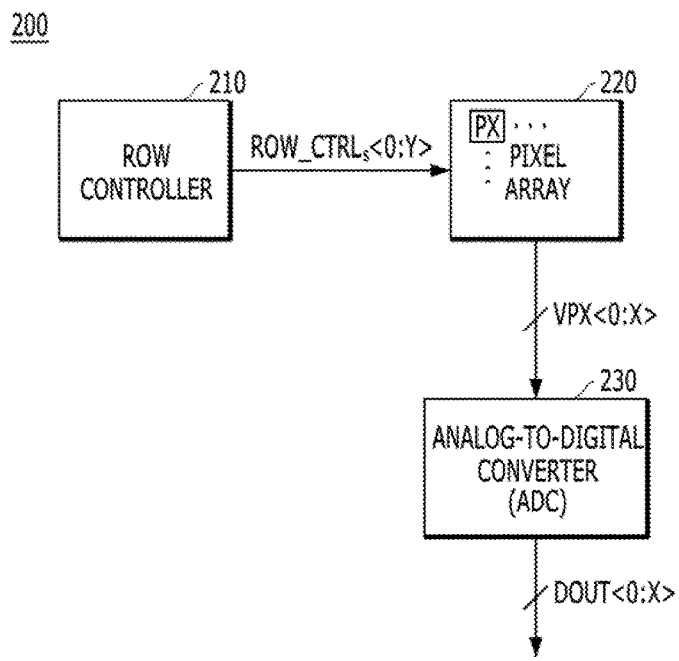
FIG. 5 is a block diagram illustrating an image sensing device, according to another embodiment of the present invention.

FIG. 5 is a block diagram illustrating an image sensing device according to another embodiment of the present invention.

Referring to FIG. 5, an image sensing device 200 according to another embodiment of the present invention may include a row controller 210, a pixel array 220, and an analog-to-digital converter (ADC) 230.

The row controller 210 may generate first to $(Y+1)^{th}$ row control signals ROW_CTRLs<0:Y> for controlling an operation of the pixel array 220 in a row unit. For example, the row controller 210 may include first to $(Y+1)^{th}$ control blocks (not illustrated) for generating the first to $(Y+1)^{th}$ row control signals ROW_CTRLs<0:Y>. Each of the first to $(Y+1)^{th}$ row control signals ROW_CTRLs<0:Y> may include a boost control signal B<k>, a transmission control signal T<k>, and a selection control signal S<k>. For example, the first row control signal ROW_CTRL<0> may include a first boost control signal B<0>, a first transmission control signal T<0> and a first selection control signal S<0>, and the $(Y+1)^{th}$ row control signal ROW_CTRL<Y> may include a $(Y+1)^{th}$ boost control signal B<Y>, a $(Y+1)^{th}$ transmission control signal T<Y> and a $(Y+1)^{th}$ selection control signal S<Y>.

The pixel array 220 may include a plurality of pixels PX arranged in row and column directions. The pixels PX may generate first to $(X+1)^{th}$ pixel signals VPX<0:X> in a row unit based on the first to $(Y+1)^{th}$ row control signals ROW_CTRLs<0:Y>. For example, the pixels arranged in a first row may simultaneously generate the first to $(X+1)^{th}$ pixel signals VPX<0:X> during a first row time based on the first row control signal ROW_CTRL<0>, and the pixels arranged in the last row may simultaneously generate the first to $(X+1)^{th}$ pixel signals VPX<0:X> during a $(Y+1)^{th}$ row time based on the $(Y+1)^{th}$ row control signal ROW_CTRL<Y>.

The analog-to-digital converter (ADC) 230 may convert the first to $(X+1)^{th}$ pixel signals VPX<0:X> into first to $(X+1)^{th}$ digital signals DOUT<0:X>. Although not illustrated in the drawing, the analog-to-digital converter (ADC) 230 may include first to $(X+1)^{th}$ readout circuit blocks for converting the first to $(X+1)^{th}$ pixel signals VPX<0:X> into the first to $(X+1)^{th}$ digital signals DOUT<0:X>.

Figure 6:
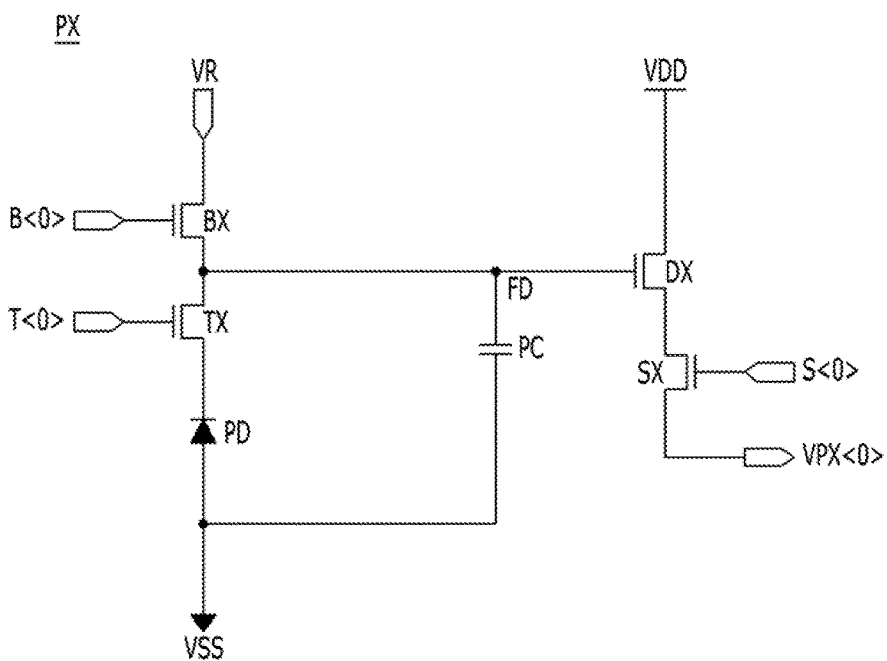
FIG. 6 is a circuit diagram illustrating a pixel configuration, according to another embodiment of the present invention.

FIG. 6 is a circuit diagram illustrating pixels according to another embodiment of the present invention. Since the pixels have the same structure, a pixel PX arranged at a cross point of the first row and a first column is representatively described hereinafter.

Referring to FIG. 6, the pixel PX may include a photodiode PD, a floating diffusion node FD, a boosting block BX, a transmission block TX, and selection blocks DX and SX.

The photodiode PD may generate a photocharge based on incident light during an exposure period.

The floating diffusion node FD may accumulate the photocharge. For example, the floating diffusion node FD may couple to a parasitic capacitor PC, and the parasitic capacitor PC may accumulate the photocharge.

The boosting block BX may initialize and boost the floating diffusion node FD with a boosted voltage VR higher than a power source voltage VDD based on the first boost control signal B<0>. To be more specific, the boosting block BX may initialize the floating diffusion node FD by discharging a charge remaining in the floating diffusion node FD into a boosted voltage VR terminal during an initialization period and may boost the floating diffusion node FD with the boosted voltage VR during a reference period after the initialization period. For example, the boosting block BX may include an NMOS transistor having a gate where the first boost control signal B<0> is inputted and a drain and a source coupled between the boosted voltage VR terminal and the floating diffusion node FD.

The transmission block TX may transmit the photocharge to the floating diffusion node FD based on the first transmission control signal T<0>. The transmission block TX may transmit the photocharge to the floating diffusion node FD during a transmission period after the reference period. In addition, the transmission block TX may initialize the photodiode PD based on the first transmission control signal T<0>. The transmission block TX may be enabled along with the boosting block BX during the initialization period and may discharge the photocharge remaining in the photodiode PD into the boosted voltage VR terminal. For example, the transmission block TX may include an NMOS transistor having a gate where the first transmission control signal T<0> is inputted and a drain and a source coupled between the floating diffusion node FD and the photodiode PD.

The selection blocks DX and SX may generate the first pixel signal VPX<0> corresponding to a voltage loaded on the floating diffusion node FD based on the first selection control signal S<0>. The selection blocks DX and SX may generate a reference signal corresponding to the boosted voltage VR as the first pixel signal VPX<0> during the reference period and generate a data signal corresponding to the photocharge as the first pixel signal VPX<0> during the transmission period. For example, the selection blocks DX and SX may include a driving unit DX and an output unit SX. The driving unit DX may drive the first pixel signal VPX<0> with the power source voltage VDD based on the voltage loaded on the floating diffusion node FD. For example, the driving unit DX may include an NMOS transistor having a gate coupled to the floating diffusion node FD and a drain and a source coupled between a power source voltage VDD terminal and the output unit SX. The output unit SX may output the first pixel signal VPX<0> to the analog-to-digital converter (ADC) 230 based on the first selection control signal S<0>. For example, the output unit SX may include an NMOS transistor having a gate where the first selection control signal S<0> is inputted and a drain and a source coupled between the driving unit DX and the analog-to-digital converter (ADC) 230.

Figure 7:
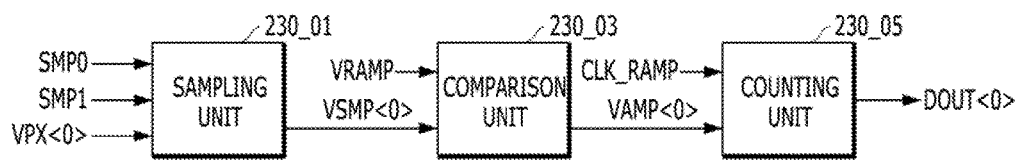
FIG. 7 is a block diagram illustrating an analog-to-digital converter (ADC), according to another embodiment of the present invention.

FIG. 7 is a block diagram illustrating an analog-to-digital converter (ADC) 230, according to another embodiment of the present invention. Since the analog-to-digital converter (ADC) 230 has the same structure as the analog-to-digital converter (ADC) 130 described above, detailed descriptions thereon are omitted herein.

Hereinafter, an operation of the image sensing device 200 having the aforementioned structure is described. As an example, an operation corresponding to the pixel PX arranged at the cross point of the first row and the first column is described below.

Figure 8:
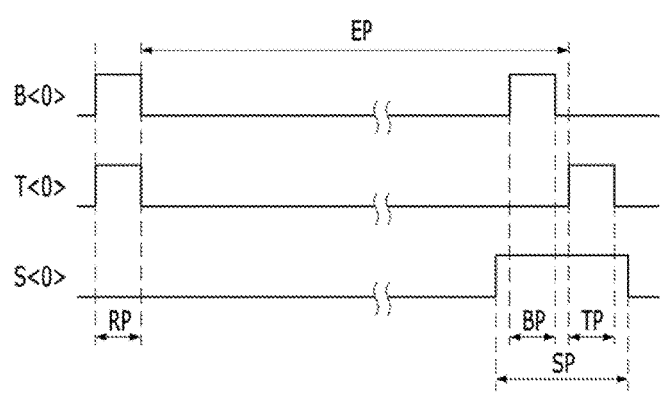
FIG. 8 is a timing diagram describing an operation of the image sensing device, according to another embodiment of the present invention.

FIG. 8 is a timing diagram describing an operation of the pixel PX included in the image sensing device 200, according to another embodiment of the present invention.

Referring to FIG. 8, the row controller 210 may generate the first row control signal ROW_CTRL<0> during the first row time. For example, the first control block of the row controller 210 may enable the first boost control signal B<0> and the first transmission control signal T<0> during the initialization period RP and enable the first selection control signal S<0> during a selection period SP after the initialization period RP. In addition, the first control block may sequentially enable the first boost control signal B<0> and the first transmission control signal T<0> during the selection period SP. For example, the first control block may enable the first boost control signal B<0> during the reference period BP corresponding to an initial period of the selection period SP, and subsequently enable the first transmission control signal T<0> during the transmission period TP corresponding to a latter period of the selection period SP.

The pixel PX may generate the first pixel signal VPX<0> based on the first row control signal ROW_CTRL<0>. Detailed descriptions thereon are as follows.

The pixel PX may initialize the photodiode PD and the floating diffusion node FD with the boosted voltage VR during the initialization period RP based on the first boost control signal B<0> and the first transmission control signal T<0>. For example, the boosting block BX may discharge the charge remaining in the floating diffusion node FD into the boosted voltage VR terminal during the initialization period RP based on the first boost control signal B<0>, and simultaneously, the transmission block TX may discharge the charge remaining in the photodiode PD into the boosted voltage VR terminal during the initialization period RP based on the first transmission control signal T<0>.

The pixel PX may generate the first pixel signal VPX<0> corresponding to the reference signal during the reference period BP and subsequently generate the first pixel signal VPX<0> corresponding to the data signal during the transmission period TP, based on the first selection control signal S<0>, the first boost control signal B<0> and the first transmission control signal T<0>. For example, the boosting block BX may boost the floating diffusion node FD with the boosted voltage VR higher than the power source voltage VDD during the reference period BP based on the first boost control signal B<0>. The selection blocks DX and SX may generate the reference signal corresponding to the boosted voltage VR as the first pixel signal VPX<0> during the reference period BP based on the voltage loaded on the floating diffusion node FD. The selection blocks DX and SX may generate the first pixel signal VPX<0> based on the power source voltage VDD. The transmission block TX may transmit the photocharge generated from the photodiode PD to the floating diffusion node FD during the transmission period TP based on the first transmission control signal T<0>. The selection blocks DX and SX may generate the data signal corresponding to the photocharge as the first pixel signal VPX<0> during the transmission period TP based on the voltage loaded on the floating diffusion node FD. The selection blocks DX and SX may generate the first pixel signal VPX<0> based on the power source voltage VDD.

The photodiode PD may generate the photocharge during the exposure period EP between a moment when the initialization period RP terminates and a moment when the transmission period TP starts.

In accordance with the embodiments of the present invention, as the floating diffusion node FD is boosted with the boosted voltage VR to a voltage that is higher than the power source voltage VDD during the reference period BP, a drain-source voltage Vds of the NMOS transistor included in the transmission block TX may increase, and a transmission capability of the transmission block TX may be improved during the transmission period TP.

In accordance with the embodiments of the present invention, as the transmission capability to transmit the photocharge generated from the photodiode to the floating diffusion node is improved, charge loss and image lag may decrease.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the spirit and/or scope of the present invention as defined by the following claims.

What is claimed is:

1. An image sensing device, comprising:
 a floating diffusion node;
 a boosting block initializing the floating diffusion node with a first voltage during an initialization period and boosting the floating diffusion node with the first voltage during a reference period of a selection period, based on a single boost control signal;
 a photodiode generating a photocharge based on incident light;
 a transmission block transmitting the photocharge to the floating diffusion node during a transmission period of the selection period based on a transmission control signal; and a selection block generating a pixel signal corresponding to a voltage loaded on the floating diffusion node during the selection period based on a selection control signal, with a second voltage.

2. The image sensing device of claim 1, further comprising:
a control block generating the single boost control signal during an initialization period and generating the selection control signal during the selection period after the initialization period and sequentially generating the single boost control signal and the transmission control signal during the selection period.

3. The image sensing device of claim 2, wherein the control block generates the transmission control signal during the initialization period.

4. The image sensing device of claim 1, wherein the selection block includes;
a driving unit driving the pixel signal with the second voltage based on the voltage loaded on the floating diffusion node; and
an output unit outputting the pixel signal based on the selection control signal.

5. The image sensing device of claim 1, wherein the selection block generates a reference signal corresponding to the first voltage as the pixel signal and generates a data signal corresponding to the photocharge as the pixel signal.

6. The image sensing device of claim 5, further comprising:
a sampling block sequentially sampling the reference signal and the data signal.

7. The image sensing device of claim 1, wherein the first voltage is higher than the second voltage.

8. The image sensing device of claim 1, wherein the single boost control signal is enabled during the initialization period of a row time and the reference period of the selection period of the row time.

9. The image sensing device of claim 1, wherein the boosting block includes;
a transistor having a gate where the single boost control signal is inputted and a drain and a source coupled between a boosted voltage terminal and the floating diffusion node.

* * * * *